United States Patent
Ozeki (10) Patent No.: US 11,423,512 B2
(45) Date of Patent: Aug. 23, 2022

(54) SUPER-RESOLUTION PROCESSING APPARATUS, METHOD, AND PROGRAM

(71) Applicant: FUJIFILM Corporation, Tokyo (JP)

(72) Inventor: Makoto Ozeki, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 159 days.

(21) Appl. No.: 16/987,381

(22) Filed: Aug. 6, 2020

(65) Prior Publication Data
US 2020/0364831 A1 Nov. 19, 2020

Related U.S. Application Data

(63) Continuation of application No. PCT/JP2019/004773, filed on Feb. 12, 2019.

(30) Foreign Application Priority Data

Feb. 28, 2018 (JP) .............................. JP2018-035353

(51) Int. Cl.
 *G06T 3/40* (2006.01)
(52) U.S. Cl.
 CPC .......... *G06T 3/4053* (2013.01); *G06T 3/4046* (2013.01)
(58) Field of Classification Search
 None
 See application file for complete search history.

(56) References Cited

FOREIGN PATENT DOCUMENTS

| JP | 2005115598 | 4/2005 |
|---|---|---|
| JP | 2010206273 | 9/2010 |
| JP | 2010278898 | 12/2010 |
| JP | 2014222442 | 11/2014 |

OTHER PUBLICATIONS

Salman Taseen Haque et al.,"Single Image Super-Resolution using Back-Propagation Neural Networks", 2017 20th International Conference and Information Technology (ICCIT), Dec. 22-24, 2017.*
Jithin Saji Isaac et al., "Super Resolution Techniques for Medical Image Processing", 2015 International COnference on Technologies for Sustainable Development (ICTSD-2015), Feb. 4-6, 2015, Mumbai, India.*

(Continued)

*Primary Examiner* — Paul F Payer
(74) *Attorney, Agent, or Firm* — JCIPRNET (57) ABSTRACT

Provided is a super-resolution processing apparatus, a method, and a program capable of generating image data with a resolution corresponding to any scale factor other than a predetermined scale factor in super-resolution processing. The super-resolution processing apparatus includes a conversion unit that performs super-resolution processing on input data to output data having a higher resolution than the input data, in which a resolution ratio of the data output from the conversion unit to the data input to the conversion unit is fixed, a down-sampling unit that performs down-sampling processing on the data input to the conversion unit or the data output from the conversion unit, and a processing unit that adjusts the resolution of the output data by adjusting a sampling rate in the down-sampling processing based on the resolution ratio.

14 Claims, 8 Drawing Sheets

(56) References Cited

OTHER PUBLICATIONS

Machine translation of Japanese Patent Appl. No. 2014-222442 to Matsuo et al., published on Nov. 27, 2014.*
Machine translation of Japanese Patent Appl. No. 2010-278898 to Nobori et al., published on Dec. 9, 2010.*
Office Action of Japan Counterpart Application, with English translation thereof, dated Sep. 22, 2021, pp. 1-6.
"International Search Report (Form PCT/ISA/210) of PCT/JP2019/004773," dated Apr. 23, 2019, with English translation thereof, pp. 1-5.
"Written Opinion of the International Searching Authority (Form PCT/ISA/237) of PCT/JP2019/004773," dated Apr. 23, 2019, with English translation thereof, pp. 1-10.
Chao Dong, et al., "Image Super-Resolution Using Deep Convolutional Networks," European Conference on Computer Vision (ECCV), Dec. 2014, pp. 1-14.
Xiaoyi Jia, et al., "Single Image Super-Resolution Using Multi-Scale Convolutional Neural Network," May 2017, pp. 1-9, available at https://arxiv.org/abs/1705.05084.
Haoyu Ren, et al., "Image Super Resolution Based on Fusing Multiple Convolution Neural Networks," 2017 IEEE Conference on Computer Vision and Pattern Recognition Workshops (CVPRW), Jul. 2017, pp. 54-61.
Wuzhen Shi, et al., "Single Image Super-Resolution with Dilated Convolution based Multi-Scale Information Learning Inception Module," IEEE International Conference on Image Processing (ICIP) 2017, Jul. 2017, pp. 1-5.
Daiki Kishimoto, et al., "Temporal Super-Resolution Based on Sparse Estimation of Spatio-Temporal Auto Regressive Model," Information and System-Lecture proceedings 1 of the IEICE General Conference 2016, Mar. 2016, pp. 1.

* cited by examiner

SUPER-RESOLUTION PROCESSING APPARATUS, METHOD, AND PROGRAM

CROSS-REFERENCE TO RELATED APPLICATIONS

This application is a Continuation of PCT International Application No. PCT/JP2019/004773 filed on Feb. 12, 2019, which claims priority under 35 U.S.C § 119(a) to Japanese Patent Application No. 2018-035353 filed on Feb. 28, 2018. Each of the above application(s) is hereby expressly incorporated by reference, in its entirety, into the present application.

BACKGROUND OF THE INVENTION

1. Field of the Invention

The present invention relates to a super-resolution processing apparatus, a method, and a non-transitory computer readable recording medium storing a program, and particularly to a super-resolution processing apparatus, a method, and a non-transitory computer readable recording medium storing a program that increase a resolution of image data in time and space.

2. Description of the Related Art

A super-resolution processing method of performing super-resolution processing for increasing a resolution of image data uses deep learning in some cases (Dong, C. et al., "Image Super-Resolution Using Deep Convolutional Networks", 2014, European Conference on Computer Vision (ECCV), Jia, X. et al., "Single Image Super-Resolution Using Multi-Scale Convolutional Neural Network", [online], 2017, arXiv, [Feb. 19, 2018 search], Internet <URL: https://arxiv.org/abs/1705.05084>, Ren, H. et al., "Image Super Resolution Based on Fusing Multiple Convolution Neural Networks", 2017, IEEE Conference on Computer Vision and Pattern Recognition (CVPR) Workshop, and Shi, W. et al., "Single Image Super-Resolution with Dilated Convolution based Multi-Scale Information Learning Inception Module", 2017, IEEE International Conference on Image Processing (ICIP)). In the super-resolution processing method using deep learning, it has been proposed to improve super-resolution performance by using input images or intermediate feature amounts of a plurality of resolutions (Jia, X. et al., "Single Image Super-Resolution Using Multi-Scale Convolutional Neural Network", [online], 2017, arXiv, [Feb. 19, 2018 search], Internet <URL: https://arxiv.org/abs/1705.05084>, Ren, H. et al., "Image Super Resolution Based on Fusing Multiple Convolution Neural Networks", 2017, IEEE Conference on Computer Vision and Pattern Recognition (CVPR) Workshop, and Shi, W. et al., "Single Image Super-Resolution with Dilated Convolution based Multi-Scale Information Learning Inception Module", 2017, IEEE International Conference on Image Processing (ICIP)).

SUMMARY OF THE INVENTION

In a case where super-resolution processing is performed, a ratio of resolutions of image data before and after the super-resolution processing is often fixed. In the following description, a ratio of a resolution of image data after the super-resolution processing to a resolution of image data before the super-resolution processing is referred to as a scale factor for the super-resolution processing. In a case where a scale factor for the super-resolution processing is fixed, a resolution of image data that can be generated from image data with a certain resolution by the super-resolution processing is uniquely determined by the scale factor. Therefore, in order to generate a plurality of pieces of image data having different resolutions from image data with a certain resolution by the super-resolution processing, it is necessary to provide a plurality of super-resolution processing engines having different scale factors. In this case, since it is necessary to prepare a data set for learning and perform learning for each of the plurality of super-resolution processing engines, there is a problem that a cost required to create the super-resolution processing engine increases.

In the description of Jia, X. et al., "Single Image Super-Resolution Using Multi-Scale Convolutional Neural Network", [online], 2017, arXiv, [Feb. 19, 2018 search], Internet <URL: https://arxiv.org/abs/1705.05084>, it is disclosed that learning of a model (general model) corresponding to a plurality of scale factors (up-scale factors) is performed. According to the technique disclosed in Jia, X. et al., "Single Image Super-Resolution Using Multi-Scale Convolutional Neural Network", [online], 2017, arXiv, [Feb. 19, 2018 search], Internet <URL: https://arxiv.org/abs/1705.05084>, although it is possible to generate image data with a resolution corresponding to a scale factor learned in advance, image data with a resolution corresponding to any scale factor other than the scale factor learned in advance cannot be generated. In addition, in the technique described in Jia, X. et al., "Single Image Super-Resolution Using Multi-Scale Convolutional Neural Network", [online], 2017, arXiv, [Feb. 19, 2018 search], Internet <URL: https://arxiv.org/abs/1705.05084>, sets of low-resolution (LR) and high-resolution (HR) images corresponding to the plurality of scale factors are combined into one, and it is necessary to prepare a data set for learning for each of the plurality of scale factors and perform learning.

The present invention has been made in view of such circumstances, and an object of the present invention is to provide a super-resolution processing apparatus, a method, and a non-transitory computer readable recording medium storing a program capable of generating image data with a resolution corresponding to any scale factor other than a predetermined scale factor in super-resolution processing.

In order to solve the above-mentioned problem, a super-resolution processing apparatus according to a first aspect of the present invention comprises: a conversion unit that performs super-resolution processing on input data to output data having a higher resolution than the input data, in which a resolution ratio of the data output from the conversion unit to the data input to the conversion unit is fixed; a down-sampling unit that performs down-sampling processing on the data input to the conversion unit or the data output from the conversion unit; and a processing unit that adjusts the resolution of the output data by adjusting a sampling rate in the down-sampling processing based on the resolution ratio.

According to the first aspect, by performing down-sampling before or after super-resolution processing, it becomes possible to generate image data with a resolution corresponding to any scale factor other than a scale factor learned in advance.

According to the first aspect, the super-resolution processing apparatus according to a second aspect of the present invention further comprises: a setting unit that sets a required resolution of the output data, in which the processing unit adjusts the sampling rate based on the resolution ratio so that the resolution of the output data matches the required resolution.

In the super-resolution processing apparatus according to a third aspect of the present invention, according to the first or second aspect, the conversion unit consists of a plurality of conversion units different in the resolution ratio from each other, and the processing unit generates the output data by combining pieces of data output from the conversion units.

In the super-resolution processing apparatus according to a fourth aspect of the present invention, according to the third aspect, the processing unit determines a method of combining the pieces of data output from the conversion units based on a correspondence relation between data with a first resolution learned in advance and data with a second resolution having a higher resolution than the data with a first resolution.

In the super-resolution processing apparatus according to a fifth aspect of the present invention, according to any one of the first to fourth aspects, the processing unit adjusts the sampling rate based on a correspondence relation between data with a first resolution learned in advance and data with a second resolution having a higher resolution than the data with a first resolution.

In the super-resolution processing apparatus according to a sixth aspect of the present invention, according to any one of the first to fifth aspects, the conversion unit performs the super-resolution processing based on a correspondence relation between data with a first resolution learned in advance and data with a second resolution having a higher resolution than the data with a first resolution.

In the super-resolution processing apparatus according to a seventh aspect of the present invention, according to any one of the first to sixth aspects, the conversion unit performs processing of increasing a spatial resolution of the data input to the conversion unit.

In the super-resolution processing apparatus according to an eighth aspect of the present invention, according to the seventh aspect, in a case where the data input to the conversion unit is two-dimensional or three-dimensional image data, the conversion unit performs processing of increasing a resolution of the image data in at least one direction.

In the super-resolution processing apparatus according to a ninth aspect of the present invention, according to any one of the first to eighth aspects, in a case where the data input to the conversion unit is moving image data, the conversion unit performs processing of increasing a frame rate of the moving image data.

A super-resolution processing method according to a tenth aspect of the present invention comprises: a conversion step of performing super-resolution processing on input data by a conversion unit to output data having a higher resolution than the input data, in which a resolution ratio of the data output from the conversion unit to the data input to the conversion unit is fixed; a down-sampling step of performing down-sampling processing on the data input to the conversion unit or the data output from the conversion unit; and a processing step of adjusting the resolution of the output data by adjusting a sampling rate in the down-sampling processing based on the resolution ratio.

A super-resolution processing program according to an eleventh aspect of the present invention causes a computer to realize: a conversion function of performing super-resolution processing on input data to output data having a higher resolution than the input data, in which a resolution ratio of the output data to the input data is fixed; a down-sampling function of performing down-sampling processing on the data before conversion by the conversion function or the data after conversion by the conversion function; and a processing function of adjusting the resolution of the output data by adjusting a sampling rate in the down-sampling processing based on the resolution ratio.

According to the present invention, by performing down-sampling before or after super-resolution processing, it becomes possible to generate image data with a resolution corresponding to any scale factor other than a fixed scale factor for the super-resolution processing in a conversion unit.

DESCRIPTION OF THE PREFERRED EMBODIMENTS

Hereinafter, embodiments of a super-resolution processing apparatus, a method, and a non-transitory computer readable recording medium storing a program according to an aspect of the present invention will be described with reference to the accompanying drawings.

First Embodiment

Figure 1:
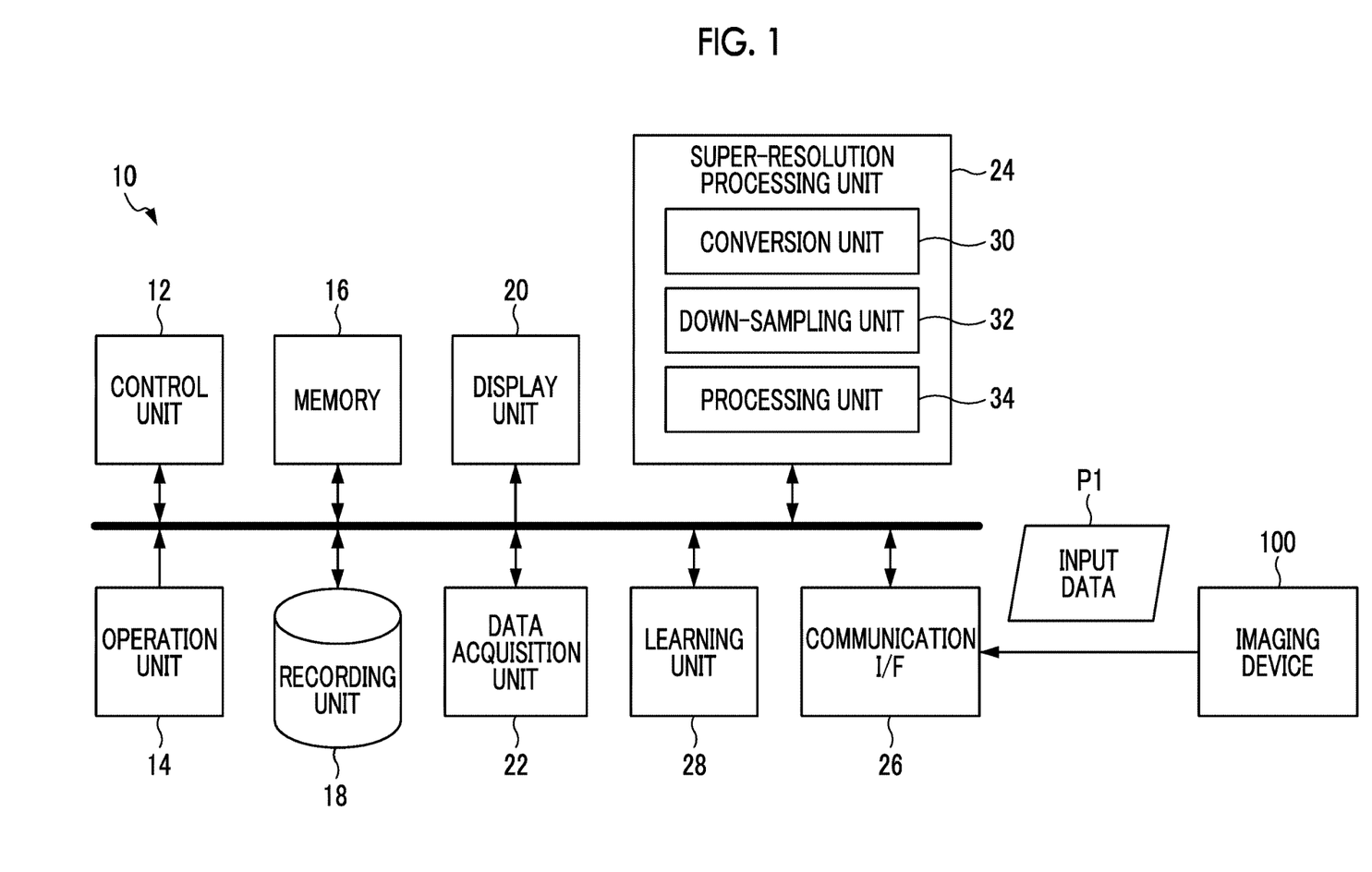
FIG. 1 is a block diagram showing a super-resolution processing apparatus according to a first embodiment of the present invention.

FIG. 1 is a block diagram showing a super-resolution processing apparatus according to a first embodiment of the present invention.

A super-resolution processing apparatus 10 according to the present embodiment acquires input data P1 including image data imaged by an imaging device 100, and performs super-resolution processing on the input data P1. The imaging device 100 is a device that captures a still image or a moving image, and includes, for example, an inspection device installed in a medical institution.

In the following description, super-resolution processing refers to processing of increasing a resolution of image data in time and space. The super-resolution processing includes processing of increasing the number of pixels of the image data included in the input data P1 to increase a spatial resolution. For example, in a case where the image data included in the input data P1 is three-dimensional image data, the super-resolution processing includes processing of increasing the number of pixels in at least one direction in the three-dimensional image data to increase a resolution along the direction. Specifically, in a case where the image data included in the input data P1 is tomographic image data such as from computed tomography (CT) or magnetic resonance imaging (MRI), the super-resolution processing includes processing of increasing the number of pixels in a direction perpendicular to a cross section of the tomographic image, that is, a slice thickness direction to increase a resolution along the direction. In a case where the image data included in the input data P1 is moving image data, the super-resolution processing includes processing of increasing a frame rate of the moving image data.

As shown in FIG. 1, the super-resolution processing apparatus 10 according to the present embodiment includes a control unit 12, an operation unit 14, a memory 16, a recording unit 18, a display unit 20, a data acquisition unit 22, a super-resolution processing unit 24, a communication interface (communication I/F) 26, and a learning unit 28.

The control unit 12 includes a central processing unit (CPU) that controls an operation of each unit of the super-resolution processing apparatus 10. The control unit 12 can transmit and receive a control signal and data to and from each unit of the super-resolution processing apparatus 10 via a bus. The control unit 12 receives an operation input from an operator via the operation unit 14 and transmits a control signal corresponding to the operation input to each unit of the super-resolution processing apparatus 10 via a bus to control the operation of each unit.

The operation unit 14 is an input device that receives the operation input from the operator, and includes a keyboard for inputting characters and a pointing device (for example, a mouse, a trackball, or the like) for operating a pointer, an icon, and the like displayed on the display unit 20. In addition, as the operation unit 14, a touch panel may be provided on a surface of the display unit 20 instead of or in addition to the keyboard and the pointing device.

The memory 16 includes a random access memory (RAM) used as a work area for various operations performed by the control unit 12 and the like, and a video random access memory (VRAM) used as an area for temporarily storing image data output to the display unit 20.

The recording unit 18 is a storage device that stores a control program used by the control unit 12, data received from the super-resolution processing apparatus 10, and the like. As the recording unit 18, for example, a device including a magnetic disk such as a hard disk drive (HDD), a device including a flash memory such as an embedded multi media card (eMMC) or a solid state drive (SSD), or the like can be used.

The display unit 20 is a device for displaying an image. As the display unit 20, for example, a liquid crystal monitor can be used.

The communication I/F 26 is means for communicating with another device via a network, and performs conversion processing of data to be transmitted and received according to a communication method. As a method of transmitting and receiving data between the super-resolution processing apparatus 10 and another device, wired communication or wireless communication (for example, local area network (LAN), wide area network (WAN), Internet connection, or the like) can be used.

The data acquisition unit 22 acquires, via the communication I/F 26, the input data P1 including image data imaged by the imaging device 100.

The super-resolution processing unit 24 performs super-resolution processing on the image data included in the input data P1 acquired by the data acquisition unit 22. The super-resolution processing unit 24 includes a conversion unit 30, a down-sampling unit 32, and a processing unit 34.

The conversion unit 30 is a super-resolution processing engine that performs super-resolution processing on the input image data and converts the image data into image data having a higher resolution. As the conversion unit 30, for example, a unit using deep learning and a neural network can be used.

The down-sampling unit 32 performs down-sampling processing on the input image data and converts the image data into image data having a lower resolution.

In a case where super-resolution processing of increasing a spatial resolution is performed, the conversion unit 30 performs processing of increasing the number of pixels of the input image data, and the down-sampling unit 32 performs processing of decreasing the number of pixels of the input image data. In a case where the input image data is two-dimensional or three-dimensional image data, the conversion unit 30 performs processing of increasing the number of pixels in at least one direction in the image data, and the down-sampling unit 32 performs processing of decreasing the number of pixels in at least one direction in the image data. In a case where the input image data is tomographic image data, the conversion unit 30 performs processing of increasing the number of pixels in a slice thickness direction perpendicular to a cross section of the tomographic image, and the down-sampling unit 32 performs processing of decreasing the number of pixels in a slice thickness direction perpendicular to the cross section of the tomographic image. In a case where super-resolution processing of increasing a time resolution of moving image data is performed, the conversion unit 30 performs processing of increasing a frame rate of the moving image data, and the down-sampling unit 32 performs processing of decreasing the frame rate of the moving image data.

In the present embodiment, a resolution ratio of the image data after conversion to the image data input to the conversion unit 30, that is, a scale factor for the super-resolution processing is fixed. Here, in a case of the super-resolution processing of increasing the spatial resolution, the scale factor for the super-resolution processing is a ratio of the number of pixels of the image data after conversion to the number of pixels of the input image data, that is, (number of pixels of image data after conversion)÷(number of pixels of input image data). In a case of the super-resolution processing of increasing the time resolution of the moving image data, the scale factor for the super-resolution processing is a ratio of the frame rate of the converted moving image data to the frame rate of the input moving image data, that is, (frame rate of moving image data after conversion)÷(frame rate of input moving image data).

In a case where the scale factor for the super-resolution processing is fixed, the resolution of the image data after conversion is uniquely determined by the resolution of the image data input to the conversion unit 30, so that image data with any resolution cannot be generated. Therefore, in the present embodiment, before or after conversion by the conversion unit 30, the down-sampling unit 32 performs down-sampling processing to adjust the resolution of the output image data.

The processing unit 34 receives, via the operation unit 14, an input of setting of a required output of output data output from the super-resolution processing unit 24. Here, the required output is a resolution of the output data after the super-resolution processing. Specifically, the required output is a spatial resolution or the number of pixels in a case of two-dimensional or three-dimensional data, the required output is a spatial resolution or the number of pixels in a direction parallel to a cross section of the tomographic image, or a slice thickness in a direction perpendicular to the cross section of the tomographic image in a case of tomographic image data, and the required output is a frame rate in a case of moving image data. These values of the required output can be set by the operator via the operation unit 14. The processing unit 34 performs down-sampling processing on the image data before or after conversion by the conversion unit 30 by using the down-sampling unit 32, so that the resolution of the output image data matches the set required output. Specifically, the processing unit 34 determines an execution timing and a sampling rate of the down-sampling processing based on the resolution of the input data, the required output, and the scale factor of the conversion unit 30.

Here, a case where the super-resolution processing is performed on two-dimensional image data will be described as an example. It is assumed that the spatial resolution of the image data included in the input data P1 is 1200 pixels per inch (ppi), the required output is 2400 ppi, and the scale factor in the conversion unit 30 is 4. In this case, in a case where the image data of 1200 ppi is converted by the conversion unit 30, image data of 4800 ppi is generated. Therefore, image data of 2400 ppi can be generated by down-sampling the image data after conversion by the conversion unit 30 at a down-sampling rate of 1/2.

In this case, it is also possible that the image data input to the super-resolution processing unit 24 is down-sampled at a down-sampling rate of 1/2 before conversion by the conversion unit 30 to generate image data of 600 ppi, and the image data of 600 ppi is input to the conversion unit 30 and converted into image data of 2400 ppi.

Next, a case where the super-resolution processing of increasing the frame rate of the moving image data is performed will be described. It is assumed that the frame rate of the moving image data included in the input data P1 is 30 frames per second (fps), the required frame rate is 40 fps, and the scale factor in the conversion unit 30 is 4. In this case, in a case where the conversion unit 30 converts the moving image data of 30 fps, moving image data of 120 fps is generated. Therefore, moving image data of 40 fps can be generated by down-sampling the moving image data after conversion by the conversion unit 30 at a down-sampling rate of 1/3 and thinning out frames.

In this case, it is also possible that the moving image data input to the super-resolution processing unit 24 is down-sampled at a down-sampling rate of 1/3 before conversion by the conversion unit 30 to generate moving image data of 10 fps, and the moving image data of 10 fps is input to the conversion unit 30 and converted into moving image data of 40 fps.

This makes it possible to perform super-resolution processing corresponding to a scale factor other than the scale factor learned in advance.

The super-resolution processing unit 24 according to the present embodiment may comprise both a conversion unit and a down-sampling unit for performing super-resolution processing related to a spatial resolution (number of pixels) and a time resolution (frame rate). This makes it possible to perform both pixel interpolation and frame rate interpolation on moving image data.

In the present embodiment, in two-dimensional image data, by changing a down-sampling rate in each of an x-axis direction and a y-axis direction orthogonal to the x-axis, a scale factor for the super-resolution processing for each axis direction can be changed. Even in three-dimensional image data, by changing a down-sampling rate in each axis direction of an xyz orthogonal coordinate system, a scale factor for the super-resolution processing for each axis direction can be changed.

The learning unit 28 causes the conversion unit 30 to perform learning using a data set for learning. The learning unit 28 updates the conversion unit 30 as the super-resolution processing engine by transferring the conversion unit 30 after learning to the super-resolution processing unit 24.

Figure 2:
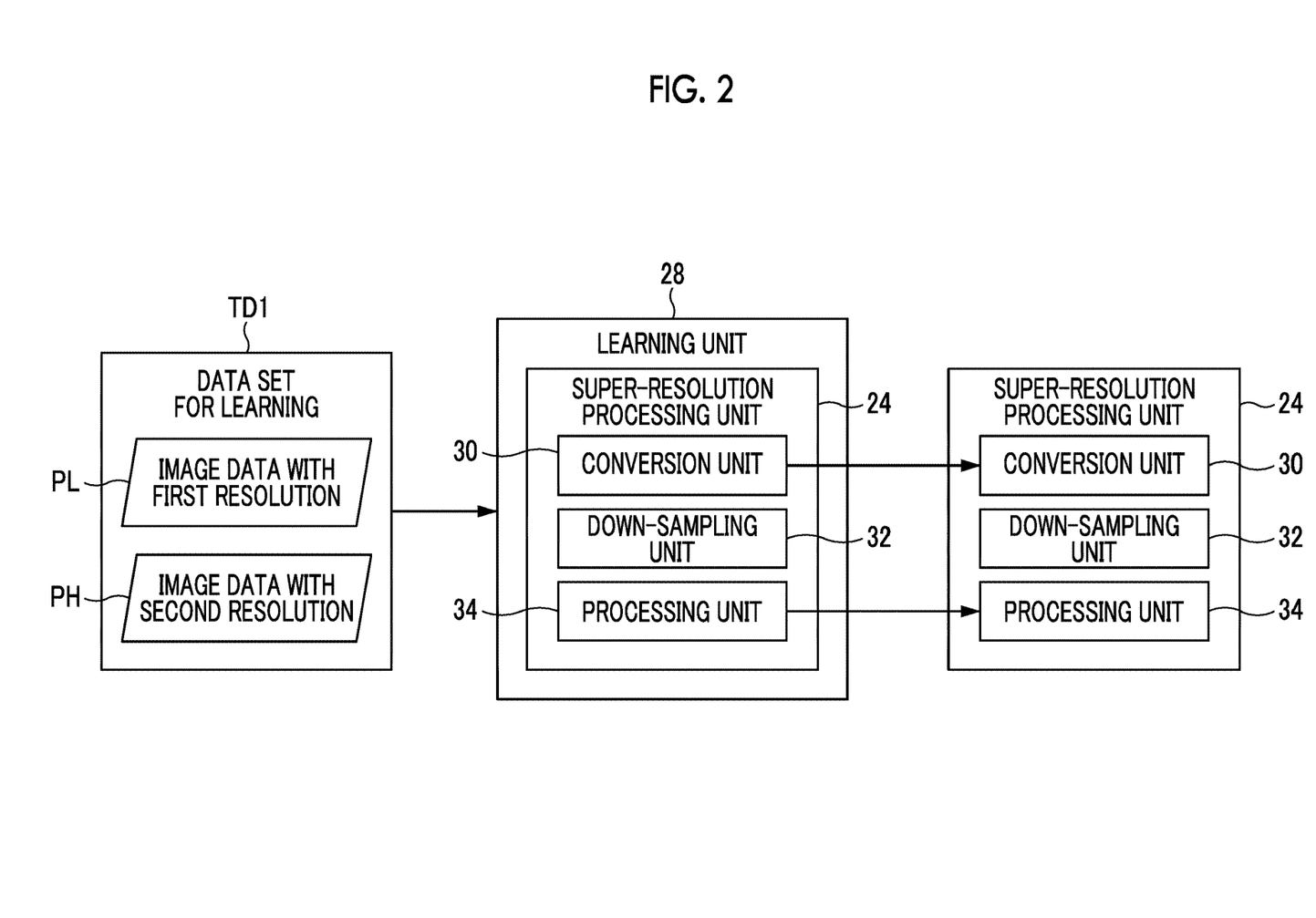
FIG. 2 is a block diagram extracting and showing a configuration related to learning in the super-resolution processing apparatus according to the first embodiment of the present invention.

As shown in FIG. 2, in a case of performing learning of the conversion unit 30, the learning unit 28 acquires a data set for learning TD1 including a set of image data PL with a first resolution and image data PH with a second resolution higher than the first resolution. Here, the image data PL with a first resolution and the image data PH with a second resolution are a set of pieces of image data with a resolution corresponding to the scale factor for the super-resolution processing in the conversion unit 30. The image data PL with a first resolution may be, for example, data obtained by down-sampling the image data PH with a second resolution at a down-sampling rate that is a reciprocal of the scale factor for the super-resolution processing. In a case where the image data PL with a first resolution and the image data PH with a second resolution are each tomographic image data, the image data PL with a first resolution may be, for example, data obtained by thinning out the image data PH with a second resolution having a smaller slice thickness than the image data PL with a first resolution at a down-sampling rate that is a reciprocal of the scale factor for the super-resolution processing.

The learning unit 28 receives the image data PL with a first resolution and outputs the image data PH with a second resolution, that is, causes the conversion unit 30 to perform learning of correct answer data. For example, the learning unit 28 compares an output in a case where the image data PL with a first resolution is input to the conversion unit 30 with the image data PH with a second resolution that is the correct answer data, and performs learning of the conversion unit 30 so that a feature amount of the output of the conversion unit 30 is substantially the same as a feature amount of the correct answer data, or a difference between both of the feature amounts is equal to or smaller than an allowable threshold value. This makes it possible to generate and update the conversion unit 30 in which the scale factor for the super-resolution processing is fixed.

The learning unit 28 may be provided in an external device different from the super-resolution processing apparatus 10. In this case, the super-resolution processing unit 24 that is the super-resolution processing engine of the super-resolution processing apparatus 10 may be updated using a learning result of the external device.

Further, the learning unit 28 performs learning related to a down-sampling rate based on a correspondence relation between image data with a first resolution learned in advance and image data with a second resolution higher than the first resolution. In a case where the down-sampling rate is changed, the learning unit 28 compares the image data generated by the super-resolution processing unit 24 from the image data PL with a first resolution with the image data PH with a second resolution, and performs learning of the conversion unit 34 so that a feature amount of the output of the conversion unit 30 is substantially the same as a feature amount of the correct answer data, or a difference between both the feature amounts is equal to or smaller than an allowable threshold value. This makes it possible to set a more appropriate down-sampling rate.

Figure 3:
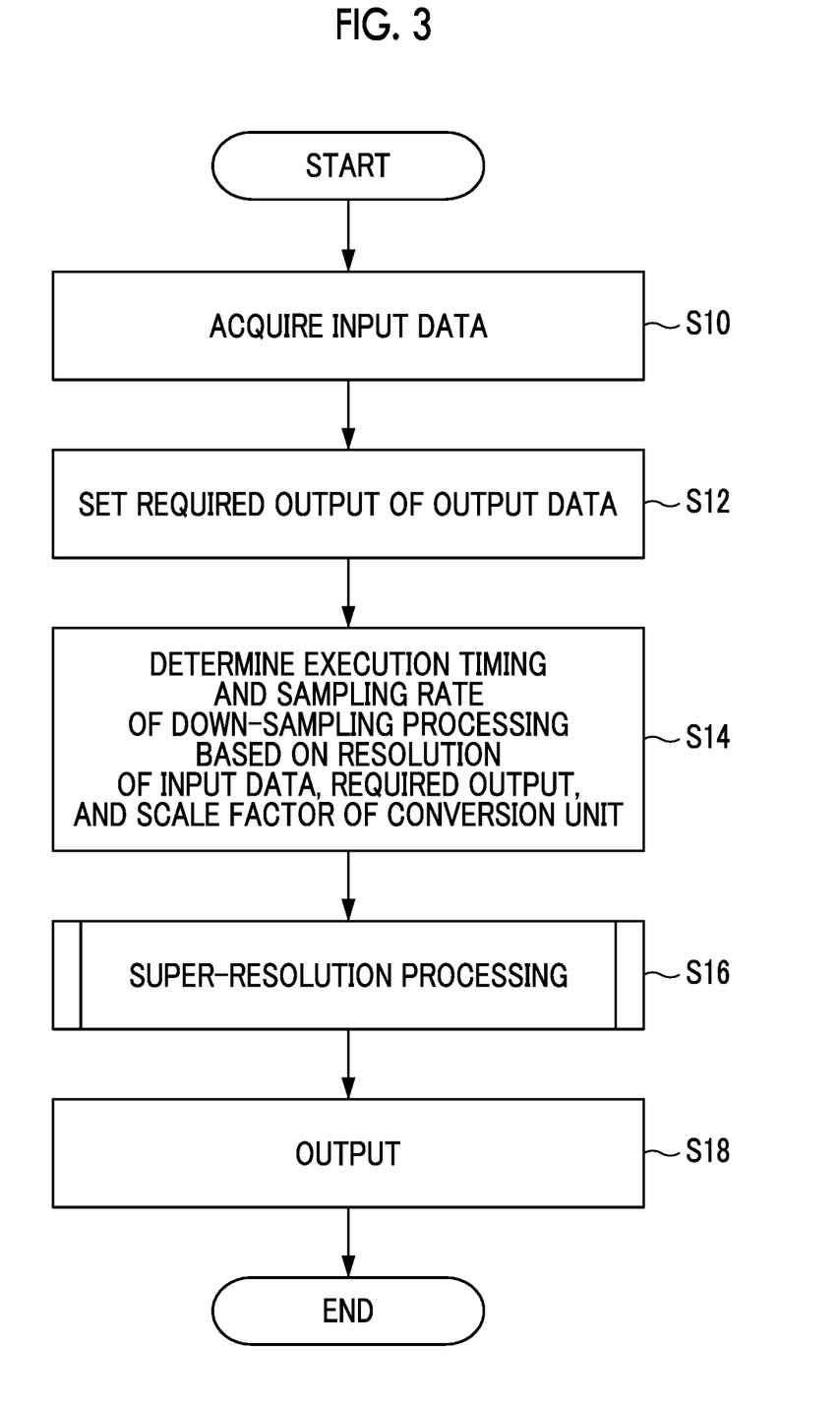
FIG. 3 is a flowchart showing a super-resolution processing method according to the first embodiment of the present invention.
Figure 4:
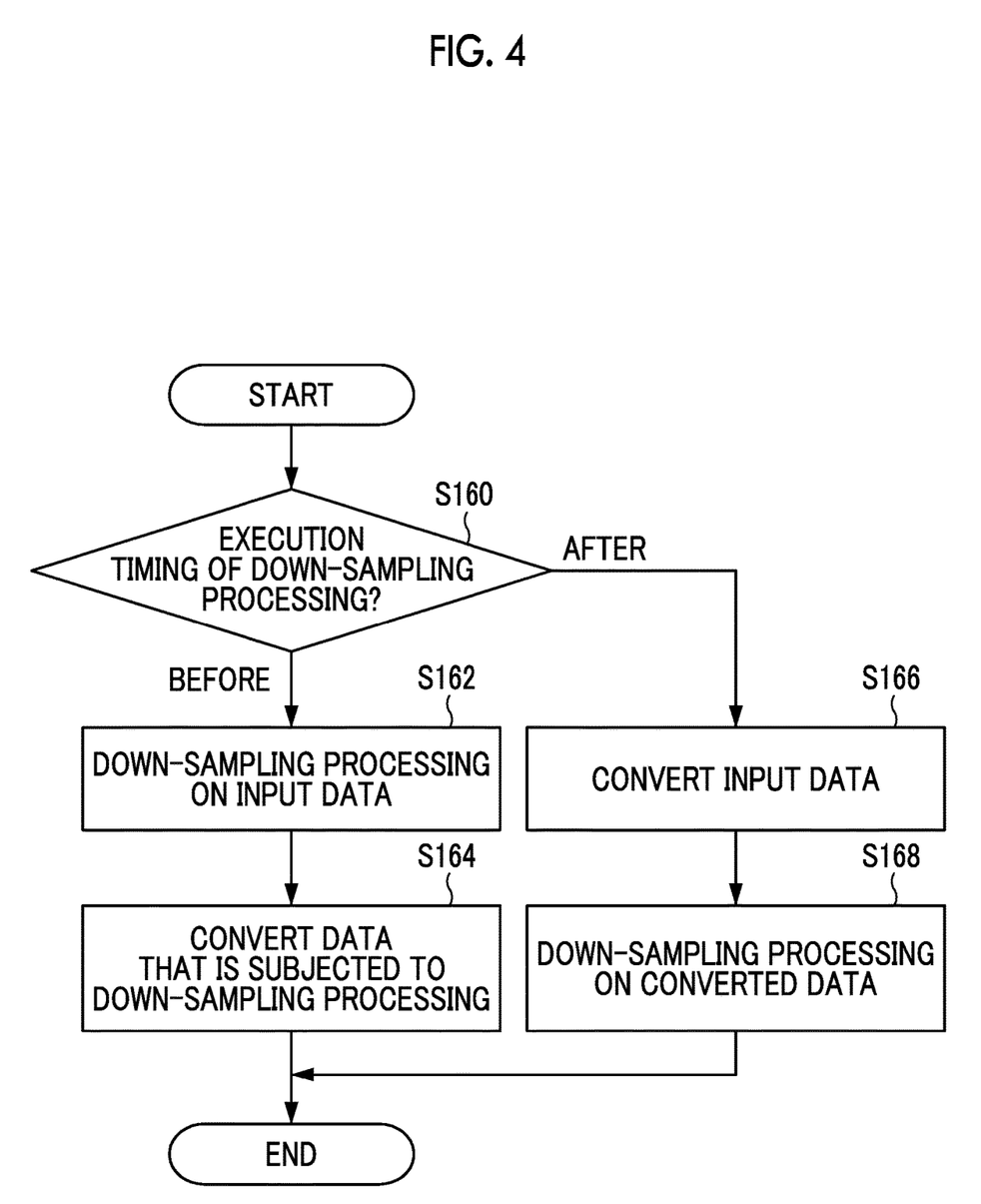
FIG. 4 is a flowchart showing a super-resolution processing step.

Next, a super-resolution processing method according to the first embodiment of the present invention will be described with reference to FIGS. 3 and 4. FIG. 3 is a flowchart showing the super-resolution processing method according to the first embodiment of the present invention. FIG. 4 is a flowchart showing a super-resolution processing step.

The data acquisition unit 22 acquires the input data P1 including image data imaged by an imaging device and stores the input data P1 in the recording unit 18.

In a case where an instruction for starting the super-resolution processing is input via the operation unit 14, the data acquisition unit 22 acquires image data to be subjected to the super-resolution processing from the recording unit 18 and inputs the image data to the super-resolution processing unit 24 (step S10).

Next, in a case where the input of setting of the required output of the output data after the super-resolution processing is received via the operation unit 14, the processing unit 34 sets the required output of the output data (step S12). Then, the processing unit 34 determines the execution timing and the sampling rate of the down-sampling processing based on the resolution of the input data, the required output, and the scale factor of the conversion unit 30 (step S14: processing step), and performs the super-resolution processing using the conversion unit 30 and the down-sampling unit 32 (step S16).

As shown in FIG. 4, in a case where the execution timing of the down-sampling processing is before conversion (step S160), the processing unit 34 performs the down-sampling processing on the input data before conversion input to the super-resolution processing unit 24 by the down-sampling unit 32 (step S162: down-sampling step). Then, the processing unit 34 performs the super-resolution processing on the data that is subjected to the down-sampling processing by the conversion unit 30 and converts the data into the image data of the required output (step S164: conversion step).

On the other hand, in a case where the execution timing of the down-sampling processing is after conversion (step S160), the processing unit 34 performs the super-resolution processing on the input data input to the super-resolution processing unit 24 by the conversion unit 30 (step S166: conversion step). Then, the processing unit performs the down-sampling processing by the down-sampling unit 32 on the data that is converted by the conversion unit 30 to generate the image data of the required output (step S168: down-sampling step).

Next, as shown in FIG. 3, the image data of the required output generated by the super-resolution processing is output from the super-resolution processing unit 24 to the display unit 20 and displayed (step S18).

Figure 5:
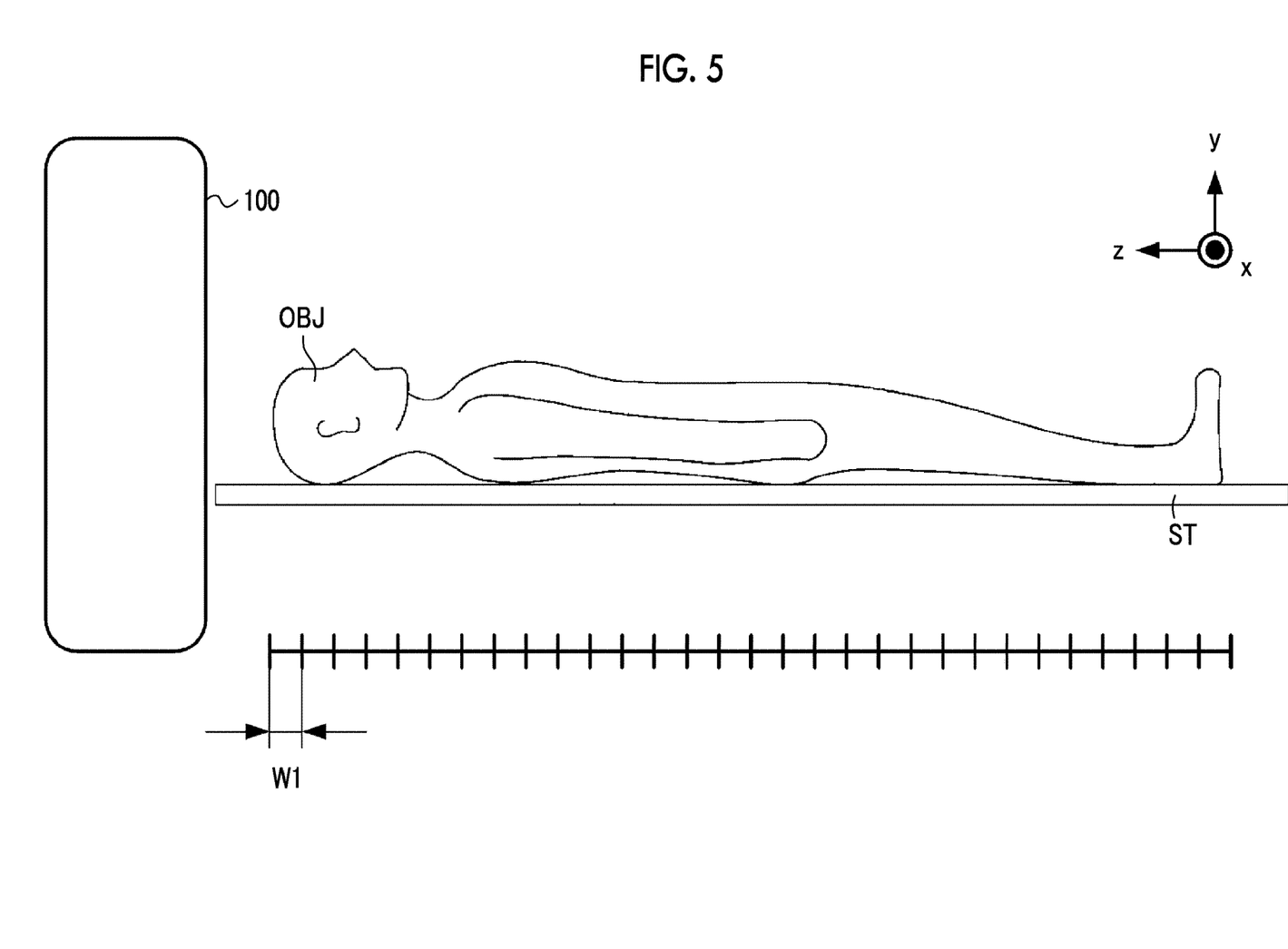
FIG. 5 is a diagram for illustrating an imaging method of tomographic image data.

Application Example of First Embodiment for Super-Resolution Processing on Tomographic Image Data Hereinafter, super-resolution processing in a direction perpendicular to a cross section of tomographic image data (CT image data) will be described. FIG. 5 is a diagram for illustrating an imaging method of the tomographic image data. A description will be given below using a three-dimensional orthogonal coordinate system in which a z-axis is a direction perpendicular to the cross section of the tomographic image data.

As shown in FIG. 5, in a case where the tomographic image data is imaged, the imaging device 100 captures a tomographic image at regular intervals W1 while relatively moving a bed ST on which a subject OBJ lies in a +z direction. In the following description, the interval W1 of the imaging is referred to as a slice thickness.

In the present embodiment, by using the conversion unit 30 and the down-sampling unit 32 in combination, it is possible to generate tomographic image data having a desired slice thickness regardless of a slice thickness of the input tomographic image data.

Table 1 shows an example of processing of a case where the scale factor of the conversion unit 30 is 4, that is, the conversion unit 30 can generate a tomographic image having a slice thickness of 1 mm from a tomographic image having a slice thickness of 4 mm.

TABLE 1

| Example | Input/required output | Pre-processing | Post-processing |
| --- | --- | --- | --- |
| A | Input: 4 mm<br>Required output: 1 mm | Not performed | Not performed |
| B | Input: 4 mm<br>Required output: 2 mm | Down-sampling to 8 mm | Not performed |
| C |  | Not performed | Down-sampling to 2 mm |
| D | Input: 3 mm<br>Required output: 1 mm | Down-sampling to 4 mm | Not performed |
| E |  | Not performed | Down-sampling to 1 mm |

In Example A of Table 1, a slice thickness of a required output is set to 1 mm, while a slice thickness of the tomographic image data input to the super-resolution processing unit 24 is 4 mm. In this example, the scale factor of the super-resolution processing in the conversion unit 30 is 4, and the conversion unit 30 performs the super-resolution processing on the input tomographic image data having a slice thickness of 4 mm, so that tomographic image data having a slice thickness of 1 mm which is the required output is generated. Therefore, down-sampling by the down-sampling unit 32 is not performed before or after conversion by the conversion unit 30, or the processing by the down-sampling unit 32 is regarded as identity conversion.

In Example B and Example C of Table 1, a slice thickness of a required output is set to 2 mm, while a slice thickness of the tomographic image data input to the super-resolution processing unit 24 is 4 mm.

In Example B, as pre-processing of conversion by the conversion unit 30, the down-sampling unit 32 performs the down-sampling processing at a down-sampling rate of 1/2 on the input tomographic image data having a slice thickness of 4 mm, and tomographic image data having a slice thickness of 8 mm is generated. Next, the conversion unit 30 performs the super-resolution processing on the tomographic image data having a slice thickness of 8 mm, so that tomographic image data having a slice thickness of 2 mm which is the required output is generated.

In Example C, the conversion unit 30 performs the super-resolution processing on the input tomographic image data having a slice thickness of 4 mm, so that tomographic image data having a slice thickness of 1 mm is generated. Next, as post-processing of conversion by the conversion unit 30, the down-sampling unit 32 performs the down-sampling processing at a down-sampling rate of 1/2 on the tomographic image data having a slice thickness of 1 mm, and tomographic image data having a slice thickness of 2 mm which is the required output is generated.

In Example D and Example E of Table 1, a slice thickness of a required output is set to 1 mm, while a slice thickness of the tomographic image data input to the super-resolution processing unit 24 is 3 mm.

In Example D, as pre-processing of conversion by the conversion unit 30, the down-sampling unit 32 performs the down-sampling processing at a down-sampling rate of 3/4 on the input tomographic image data having a slice thickness of 3 mm, and tomographic image data having a slice thickness of 4 mm is generated. Then, the conversion unit 30 performs the super-resolution processing on the tomographic image data having a slice thickness of 4 mm, so that tomographic image data having a slice thickness of 1 mm which is the required output is generated.

In Example E, the conversion unit 30 performs the super-resolution processing on the input tomographic image data having a slice thickness of 3 mm, so that tomographic image data having a slice thickness of 0.75 mm is generated. Next, as post-processing of conversion by the conversion unit 30, the down-sampling unit 32 performs the down-sampling processing at a down-sampling rate of 3/4 on the tomographic image data having a slice thickness of 0.75 mm, and tomographic image data having a slice thickness of 1 mm which is the required output is generated.

Down-sampling as post-processing of the super-resolution processing is more preferable because the resolution of the image data used for the super-resolution processing in the conversion unit 30 is high and the information amount is large.

A slice thickness of the CT image is various, and an appearance when displaying the CT image is different depending on a slice thickness. In general, in a case where a slice thickness is thick, unevenness is conspicuous, and in a case where a slice thickness is thin, an organ and the like can be grasped in detail. According to the present embodiment, it is possible for tomographic image data to be converted into tomographic image data having any slice thickness corresponding to a scale factor other than the scale factor learned in advance, regardless of the slice thickness of the input tomographic image data. As a result, visualization using pieces of tomographic image data having different slice thicknesses can be performed according to a purpose and a target of an image diagnosis, and convenience of a doctor who performs the image diagnosis using the tomographic image data improves.

In general, in a case where the tomographic image data is imaged, a noise of the tomographic image data increases as a slice thickness decreases. For this reason, an irradiation dose of radiation is increased to decrease the noise of the tomographic image data. According to the present embodiment, since tomographic image data having any slice thickness can be generated from a slice thickness of the input tomographic image data, the irradiation dose of radiation during imaging can be decreased.

Second Embodiment

Next, a second embodiment of the present invention will be described.

Figure 6:
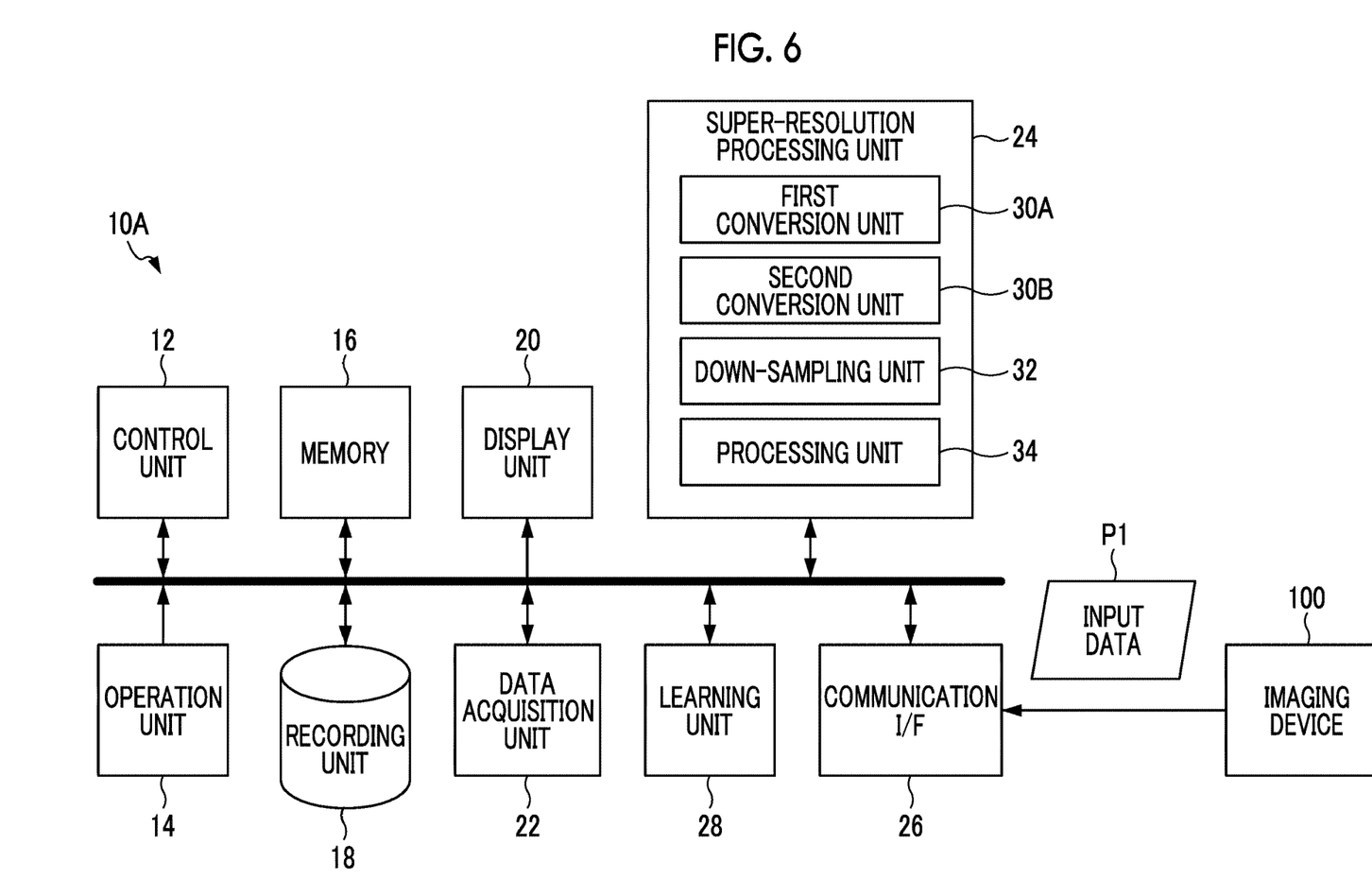
FIG. 6 is a block diagram showing a super-resolution processing apparatus according to a second embodiment of the present invention.

FIG. 6 is a block diagram showing a super-resolution processing apparatus according to a second embodiment of the present invention. In the following description, the same components as those in the first embodiment are denoted by the same reference numerals, and description thereof will be omitted.

The super-resolution processing unit 24 of a super-resolution processing apparatus 10A according to the present embodiment comprises a first conversion unit 30A and a second conversion unit 30B. In each of the first conversion unit 30A and the second conversion unit 30B, a scale factor for the super-resolution processing is fixed, and the first conversion unit 30A and the second conversion unit 30B have different scale factors.

In the present embodiment, the first conversion unit 30A and the second conversion unit 30B having different scale factors for super-resolution processing are used in combination. Specifically, the processing unit 34 determines, based on the resolution of the input data, the required output, and the scale factor of the conversion unit 30, a conversion unit used for the super-resolution processing and a data processing method in addition to an execution timing and a sampling rate of the down-sampling processing. Then, the down-sampling processing is performed before and after the super-resolution processing by the first conversion unit 30A and the second conversion unit 30B, and pieces of image data generated using the first conversion unit 30A and the second conversion unit 30B are connected together. Thereby, image data having any resolution is generated. Here, as a method of connecting the pieces of image data together, there is a method of calculating an additional value or an average value of pixel values of the image data, or a method of performing weighted addition according to the resolution of each image data. In a case where weighted addition is performed, it is preferable to increase a weight value of image data having a higher resolution among pieces of image data to be combined.

The method of connecting the pieces of image data together may be determined based on a correspondence relation between image data with a first resolution learned in advance and the image data with a second resolution higher than the first resolution.

Figure 7:
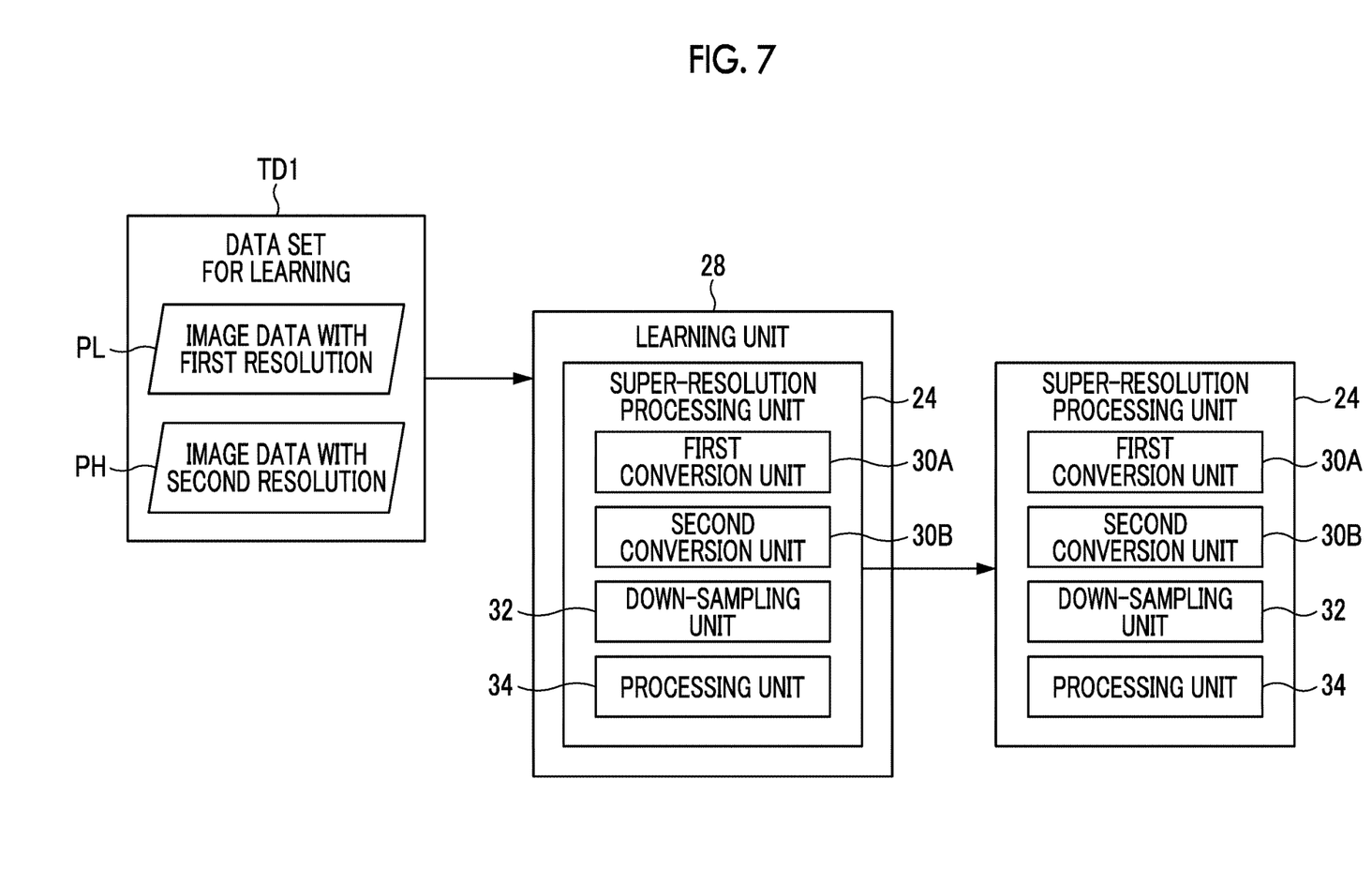
FIG. 7 is a block diagram extracting and showing a configuration related to learning in the super-resolution processing apparatus according to the second embodiment of the present invention.

Next, learning of the method of connecting the pieces of image data together will be described. FIG. 7 is a block diagram extracting and showing a configuration related to learning in the super-resolution processing apparatus according to the second embodiment of the present invention.

As shown in FIG. 7, in a case of performing learning of the conversion unit 30, the learning unit 28 acquires the data set for learning TD1 including the set of the image data PL with a first resolution and the image data PH with a second resolution higher than the first resolution.

The learning unit 28 compares the image data PH with a second resolution with the image data generated in a case of changing the image data PL with a first resolution, a timing of down-sampling, a down-sampling rate, and the data processing method in a case where the pieces of image data generated by the first conversion unit 30A and the second conversion unit 30B are connected together, and performs learning of the conversion unit 30 so that a feature amount of the output of the conversion unit 30 is substantially the same as a feature amount of the correct answer data, or a difference between both the feature amounts is equal to or smaller than an allowable threshold value.

Figure 8:
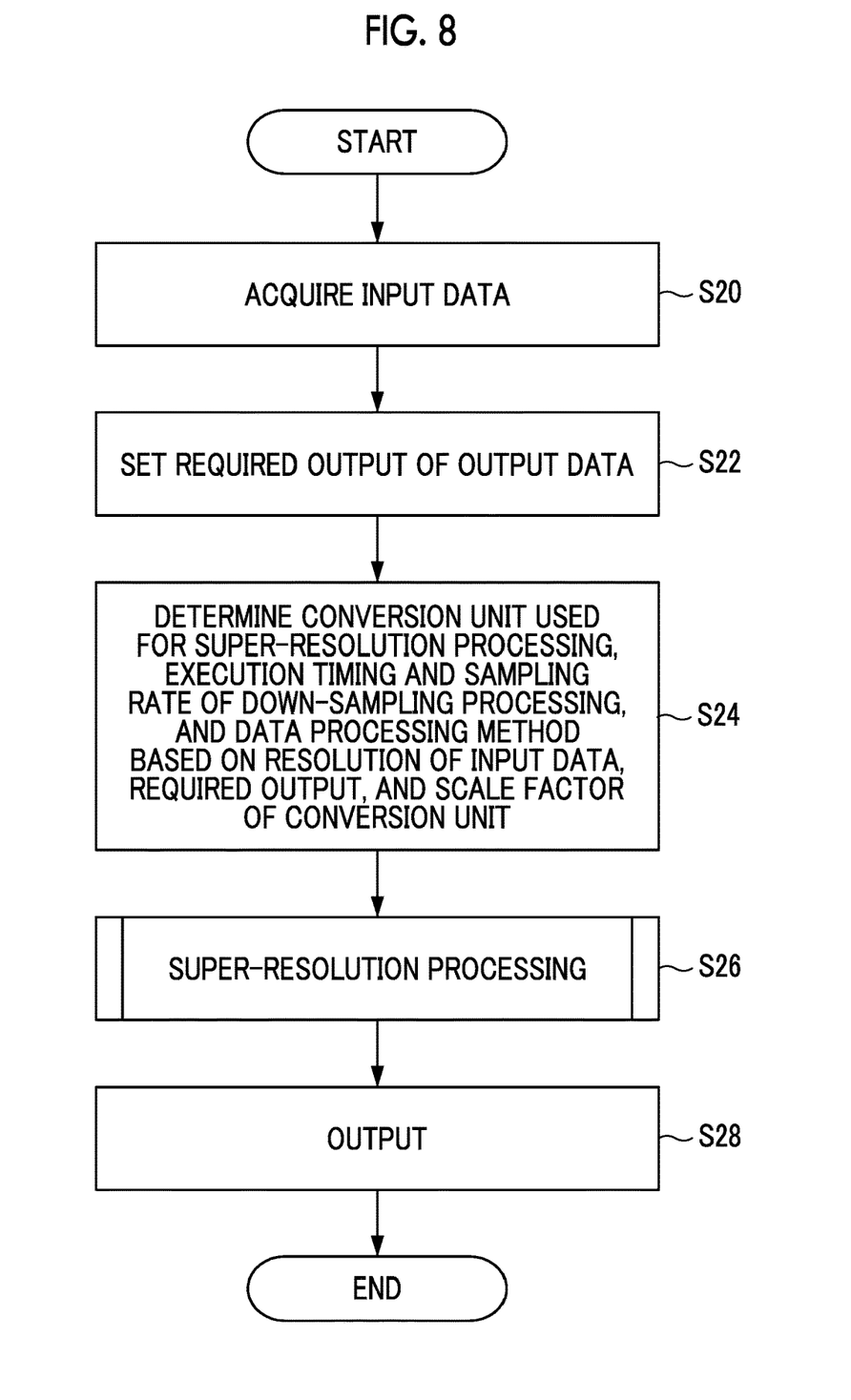
FIG. 8 is a flowchart showing a super-resolution processing method according to the second embodiment of the present invention.

Next, a super-resolution processing method according to the second embodiment of the present invention will be described with reference to FIG. 8. FIG. 8 is a flowchart showing the super-resolution processing method according to the second embodiment of the present invention.

The data acquisition unit 22 acquires the input data P1 including image data imaged by an imaging device and stores the input data P1 in the recording unit 18.

In a case where an instruction for starting the super-resolution processing is input via the operation unit 14, the data acquisition unit 22 acquires image data to be subjected to the super-resolution processing from the recording unit 18 and inputs the image data to the super-resolution processing unit 24 (step S20).

Next, in a case where the input of setting of the required output of the output data after the super-resolution processing is received via the operation unit 14, the processing unit 34 sets the required output of the output data (step S22). Then, the processing unit 34 determines a conversion unit used for the super-resolution processing, the execution timing and the sampling rate of the down-sampling processing, and the data processing method based on the resolution of the input data, the required output, and the scale factors of the conversion unit 30A and the second conversion unit 30B (step S24: processing step), and performs the super-resolution processing using the conversion unit 30 and the down-sampling unit 32 (step S26). The image data of the required output generated by the super-resolution processing is output from the super-resolution processing unit 24 to the display unit 20 and displayed (step S28: conversion step and down-sampling step).

Application Example of Second Embodiment for Super-Resolution Processing on Tomographic Image Data Hereinafter, super-resolution processing in a direction perpendicular to a cross section of tomographic image data (CT image data) will be described.

Table 2 shows an example of processing of a case where the scale factors of the first conversion unit 30A and the second conversion unit 30B are 4 and 2, respectively. In Table 2, the first conversion unit 30A and the second conversion unit 30B are described as models 1 and 2, respectively.

TABLE 2

| Example | Input/ required output | Pre-processing | Model | Post-processing |
|---|---|---|---|---|
| F | Input: 2 mm | Not performed | Only model 2 | Not performed |
| G | Required output: 1 mm | Not performed | Model 1 and model 2 | Output of model 1 is down-sampled to 1 mm and average value is calculated |
| H | Input: 3 mm Required output: 1 mm | Not performed | Model 1 and model 2 | Outputs of model 1 and model 2 are down-sampled and weighted sum is calculated |
| I | | Not performed | Model 1 and model 2 | Output data is generated from each result according to connection method determined by learning |

In Example F and Example G of Table 2, a slice thickness of a required output is set to 1 mm, while a slice thickness of the tomographic image data input to the super-resolution processing unit 24 is 2 mm.

In Example F, the scale factor for the super-resolution processing in the second conversion unit 30B is 2. Therefore, the processing unit 34 performs the super-resolution processing on the input tomographic image data having a slice thickness of 2 mm by the second conversion unit 30B, thereby generating tomographic image data having a slice thickness of 1 mm which is the required output. Therefore, down-sampling by the down-sampling unit 32 is not performed before or after conversion, or the processing by the down-sampling unit 32 is regarded as identity conversion.

With respect to this, in Example G, the processing unit 34 performs the super-resolution processing on the input tomographic image data having a slice thickness of 2 mm by the first conversion unit 30A and the second conversion unit 30B, thereby generating tomographic image data having a slice thickness of 0.5 mm and tomographic image data having a slice thickness of 1 mm. Then, the processing unit 34 performs the down-sampling processing at a down-sampling rate of 1/2 on the tomographic image data having a slice thickness of 0.5 mm generated by the first conversion unit 30A, and generates tomographic image data with a slice thickness of 1 mm. Next, the processing unit 34 creates an average image of the tomographic image data generated by performing the down-sampling processing after conversion by the first conversion unit 30A and the tomographic image data generated by the second conversion unit 30B. Here, for example, the average image may be generated by calculating an average value of pixel values of the tomographic image data generated by performing the down-sampling processing after conversion by the first conversion unit 30A and the tomographic image data generated by the second conversion unit 30B, or may be generated by calculating a weighted average. Also in Example G, it is possible to generate tomographic image data having a slice thickness of 1 mm which is the required output.

In Example H and Example I of Table 2, a slice thickness of a required output is set to 1 mm, while a slice thickness of the tomographic image data input to the super-resolution processing unit 24 is 3 mm.

In Example H and Example I, the processing unit 34 performs the super-resolution processing on the input tomographic image data having a slice thickness of 3 mm by the first conversion unit 30A and the second conversion unit 30B, thereby generating tomographic image data having a slice thickness of 0.75 mm and tomographic image data having a slice thickness of 1.5 mm.

Next, in Example H, the processing unit 34 performs the down-sampling processing at a down-sampling rate of 1/2 on the tomographic image data having a slice thickness of 0.5 mm generated by the first conversion unit 30A, and generates tomographic image data with a slice thickness of 1 mm. Next, the processing unit 34 creates a composite image by performing weighted addition according to each slice thickness on the tomographic image data generated by performing the down-sampling processing after conversion by the first conversion unit 30A and the tomographic image data generated by the second conversion unit 30B. The composite image can be generated by calculating a weighted addition value or a weighted average value of pixel values of the tomographic image data generated by performing the down-sampling processing after conversion by the first conversion unit 30A and the tomographic image data generated by the second conversion unit 30B.

In Example H, the composite image may be created by performing weighted addition according to each slice thickness without performing the down-sampling processing on the tomographic image data having a slice thickness of 0.75 mm and the tomographic image data having a slice thickness of 1.5 mm generated by the first conversion unit 30A and the second conversion unit 30B, respectively.

On the other hand, in Example I, the composite image is created according to a connection method determined by learning using the tomographic image data having a slice thickness of 0.75 mm and the tomographic image data having a slice thickness of 1.5 mm generated by the first conversion unit 30A and the second conversion unit 30B, respectively.

According to these examples, by using the two conversion units and the down-sampling unit 32 in combination, it is possible to generate tomographic image data having a desired slice thickness regardless of a slice thickness of the input tomographic image data.

In the second embodiment, the number of conversion units is two, but the number of conversion units is not limited to this, and may be three or more. Further, in the second embodiment, for example, the first conversion unit 30A and the second conversion unit 30B may be connected to each other in series, and the image data converted by the first conversion unit 30A may be further converted by the second conversion unit 30B.

In the present embodiment, in two-dimensional image data, by changing at least one of a conversion unit used for the super-resolution processing or a down-sampling rate in each of an x-axis direction and a y-axis direction orthogonal to the x-axis, a scale factor for the super-resolution processing for each axis direction can be changed. Even in three-dimensional image data, by changing at least one of a conversion unit used for the super-resolution processing or a down-sampling rate in each axis direction of an xyz orthogonal coordinate system, a scale factor for the super-resolution processing for each axis direction can be changed.

Regarding Invention of Program

The present invention can be also realized as a program (super-resolution processing program) that causes a computer to realize the types of processing described above (conversion function, down-sampling function, and processing function), or a non-transitory recording medium or a program product storing such a program. By applying such a program to a computer, it becomes possible for calculation means, recording means, and the like of the computer to realize a function corresponding to each step of the super-resolution processing method according to the present embodiment.

In each embodiment, a hardware structure of a processing unit that executes various types of processing can be realized as various processors described below. The various processors include a central processing unit (CPU) that is a general-purpose processor that executes software (programs) to function as various processing units, a programmable logic device (PLD) that is a processor capable of changing a circuit configuration after manufacture, such as a field programmable gate array (FPGA), and an exclusive electric circuit that is a processor having a circuit configuration exclusively designed to execute a specific process, such as an application specific integrated circuit (ASIC).

One processing unit may be configured with one of these various processors, or may be configured with two or more same or different processors (for example, a plurality of FPGAs or a combination of a CPU and an FPGA). In addition, a plurality of processing units may be configured with one processor. A first example of configuring a plurality of processing units with one processor is such that one processor is configured with a combination of one or more CPUs and a software, and the processor functions as the plurality of processing units, as represented by a computer such as a client or a server. A second example thereof is such that a processor that realizes the function of the whole system including the plurality of processing units using one integrated circuit (IC) chip is used, as represented by a system on chip (SoC) or the like. As described above, the various processing units are configured using one or more of the above various processors as the hardware structure.

Furthermore, the hardware structure of the various processors is more specifically an electric circuit (circuitry) in which circuit elements such as semiconductor elements are combined. Another aspect of the present invention is a super-resolution processing apparatus, in which a processor performs super-resolution processing on input data to output data having a higher resolution than the input data, in which a resolution ratio of the data output from the processor to the data input to the processor is fixed, performs down-sampling processing on the data input to the processor or the data output from the processor, and adjusts the resolution of the output data by adjusting a sampling rate in the down-sampling processing based on the resolution ratio.

EXPLANATION OF REFERENCES 10, 10A: super-resolution processing apparatus
12: control unit
14: operation unit
16: memory
18: recording unit
20: display unit
22: data acquisition unit
24: super-resolution processing unit
26: communication interface
28: learning unit
30: conversion unit
30A: first conversion unit
30B: second conversion unit
32: down-sampling unit
34: processing unit
100: imaging device
S10 to S28, S160 to S168: each step of super-resolution processing method

What is claimed is:

1. A super-resolution processing apparatus comprising:
a processor configured to
perform super-resolution processing on input data to output data having a higher resolution than the input data, in which a resolution ratio of the data output from the processor to the data input to the processor is fixed;
perform down-sampling processing on the data input to the processor or the data output from the processor; and
adjust the resolution of the output data by adjusting a sampling rate in the down-sampling processing based on the resolution ratio,
wherein the processor consists of a plurality of processors different in the resolution ratio from each other,
wherein the plurality of processors each perform processing of increasing a spatial resolution of the data input to the respective processor, and
the processor generates the output data by combining pieces of data output from the processors.

2. The super-resolution processing apparatus according to claim 1, the processor further configured to:
set a required resolution of the output data,
wherein the processor adjusts the sampling rate based on the resolution ratio so that the resolution of the output data matches the required resolution.

3. The super-resolution processing apparatus according to claim 2,
wherein the processor determines a method of combining the pieces of data output from the processors based on a correspondence relation learned in advance between data with a first resolution and data with a second resolution having a higher resolution than the data with a first resolution.

4. The super-resolution processing apparatus according to claim 2, wherein the processor adjusts the sampling rate based on a correspondence relation learned in advance between data with a first resolution and data with a second resolution having a higher resolution than the data with a first resolution.

5. The super-resolution processing apparatus according to claim 2, wherein the processor performs the super-resolution processing based on a correspondence relation learned in advance between data with a first resolution and data with a second resolution having a higher resolution than the data with a first resolution.

6. The super-resolution processing apparatus according to claim 2, wherein, in a case where the data input to the processor is two-dimensional or three-dimensional image data, the processor performs processing of increasing a resolution of the image data in at least one direction.

7. The super-resolution processing apparatus according to claim 2, wherein, in a case where the data input to the processor is moving image data, the processor performs processing of increasing a frame rate of the moving image data.

8. The super-resolution processing apparatus according to claim 1, wherein the processor determines a method of combining the pieces of data output from the processors based on a correspondence relation learned in advance between data with a first resolution and data with a second resolution having a higher resolution than the data with a first resolution.

9. The super-resolution processing apparatus according to claim 1, wherein the processor adjusts the sampling rate based on a correspondence relation learned in advance between data with a first resolution and data with a second resolution having a higher resolution than the data with a first resolution.

10. The super-resolution processing apparatus according to claim 1, wherein the processor performs the super-resolution processing based on a correspondence relation learned in advance between data with a first resolution and data with a second resolution having a higher resolution than the data with a first resolution.

11. The super-resolution processing apparatus according to claim 1, wherein, in a case where the data input to the processor is two-dimensional or three-dimensional image data, the processor performs processing of increasing a resolution of the image data in at least one direction.

12. The super-resolution processing apparatus according to claim 1, wherein, in a case where the data input to the processor is moving image data, the processor performs processing of increasing a frame rate of the moving image data.

13. A super-resolution processing method comprising:

a conversion step of performing super-resolution processing on input data by a processor to output data having a higher resolution than the input data, in which a resolution ratio of the data output from the processor to the data input to the processor is fixed;

a down-sampling step of performing down-sampling processing on the data input to the processor or the data output from the processor; and a processing step of adjusting the resolution of the output data by adjusting a sampling rate in the down-sampling processing based on the resolution ratio, wherein the processor consists of a plurality of processors different in the resolution ratio from each other, wherein the plurality of processors each perform processing of increasing a spatial resolution of the data input to the respective processor, and the processor generates the output data by combining pieces of data output from the processors.

14. A non-transitory computer readable recording medium storing a super-resolution processing program causing a computer to realize:

a conversion function of performing super-resolution processing on input data by a processor to output data having a higher resolution than the input data, in which a resolution ratio of the output data from the processor to the input data to the processor is fixed;

a down-sampling function of performing down-sampling processing on the data input to the processor before conversion by the conversion function or the data after conversion output from the processor; and a processing function of adjusting the resolution of the output data by adjusting a sampling rate in the down-sampling processing based on the resolution ratio, wherein the processor consists of a plurality of processors different in the resolution ratio from each other, wherein the plurality of processors each perform processing of increasing a spatial resolution of the data input to the respective processor, and the processor generates the output data by combining pieces of data output from the processors.

* * * * *